(12) United States Patent
Martin Parrondo et al.

(10) Patent No.: US 8,057,597 B2
(45) Date of Patent: Nov. 15, 2011

(54) CAPSULE AND ELEMENTS FOR SYNTHESISED DIAMOND PRODUCTION

(75) Inventors: Ramon Martin Parrondo, Carmona (ES); Dmitri Bagriantsev, Carmona (ES)

(73) Assignee: Instituto de Monocristales, S.L., Carmona (ES)

( * ) Notice: Subject to any disclaimer, the term of this patent is extended or adjusted under 35 U.S.C. 154(b) by 451 days.

(21) Appl. No.: 11/816,075

(22) PCT Filed: Aug. 16, 2005

(86) PCT No.: PCT/ES2005/000462
§ 371 (c)(1),
(2), (4) Date: Dec. 2, 2009

(87) PCT Pub. No.: WO2006/082257
PCT Pub. Date: Aug. 10, 2006

(65) Prior Publication Data
US 2011/0132256 A1   Jun. 9, 2011

(30) Foreign Application Priority Data
Feb. 21, 2005 (ES) .................................. 200500386

(51) Int. Cl.
*C30B 35/00* (2006.01)
(52) U.S. Cl. ........................................ 117/200; 117/929
(58) Field of Classification Search .................. 117/200, 117/900, 216; 423/446
See application file for complete search history.

(56) References Cited

U.S. PATENT DOCUMENTS

| | | | |
|---|---|---|---|
| 3,407,445 A * | 10/1968 | Strong | 425/77 |
| 4,147,255 A | 4/1979 | Ishizuka | |
| 4,301,134 A | 11/1981 | Strong | |
| 4,409,193 A * | 10/1983 | Sato et al. | 423/290 |
| 4,632,817 A * | 12/1986 | Yazu et al. | 423/446 |
| 6,030,595 A | 2/2000 | Sumiya et al. | |

OTHER PUBLICATIONS

Wakatsuki, et al. "Growth of Diamond with Zr-containing Molten Metal Solvents and Metal Elements as Incorporated Impurities," *Diamond and Related Materials*,, vol. 8, pp. 1438-1440, 1999.
International Search Report issued in International Application No. PCT/EP2005/000462 dated Dec. 20, 2005.
International Preliminary Report on Patentability issued in International Application No. PCT/EP2005/000462.
Written Opinion issued in International Application No. PCT/EP2005/000462.

* cited by examiner

*Primary Examiner* — Michael Kornakov
*Assistant Examiner* — Irina Kalish
(74) *Attorney, Agent, or Firm* — Steven Hultquist; Hultquist IP; Kelly K. Reynolds (57) ABSTRACT

The present invention consists in obtaining, with the capsule described, a vertical gradient favorable for diamond growth that prevails over any radial gradient by means of heating discs placed at the ends of the heating area, which implies a considerable control over the growth conditions. More specifically, in regard to the rate of growth, it allows for a better control of the quality of large crystals. Another important novelty is to use a source of carbon with a special design formed by cylindrical and conical hollows (graphite, amorphous carbon, diamond or other) with a solvent metal with a number of gases that are introduced in the capsule.
Also, a nitrogen scavenger is used to avoid the formation of nitrides, carbides and oxides that are harmful for the growth and that as a significant novelty is placed outside the reaction area.

2 Claims, 7 Drawing Sheets

% by weight of the conductor component
of the heating disk

Curve 1: W   Curve 2: Graphite

Dependence of the growth rate versus time 1. conventional
2. system object of the invention

FIG. 7

CAPSULE AND ELEMENTS FOR SYNTHESISED DIAMOND PRODUCTION

OBJECT OF THE INVENTION

The present invention refers to a capsule having different elements incorporated to a high pressure high temperature machine with the aim to, by means of the temperature gradient diamond growth method, effect the synthesis of type Ib, IIa and IIb diamond monocrystals inside it.

BACKGROUND OF THE INVENTION

Generally, diamonds obtained by synthesis at high pressure and high temperature are those known as type Ib and contain hundreds of ppm of nitrogen in their crystalline lattice. Due to the structural nitrogen content, the color of the diamond crystals ranges from light yellow to dense yellow, a limitation that usually is reflected in their having a lower value for the jewelry industry.

On the other hand, this color can be extracted by introducing a nitrogen scavenger in the reaction area mixed with the solvent. In this manner, the solvent is free of the dissolved nitrogen, since the nitrogen reacts with the scavenger, forming compounds such as nitrides, carbides, various intermediate compounds and their combinations thereof. The effect of this competition for nitrogen between the scavenger and the carbon is that less nitrogen enters the diamond crystalline network that is growing, providing crystals that are substantially free of nitrogen.

These crystals are of the type known as type IIa, due to the rarity of said crystals in nature, since they are colorless, their excellent properties of thermal conductivity and hardness making them highly valued in the market.

The inconvenience of these crystals is that their production is extraordinarily difficult, especially because the competition reaction caused by the nitrogen scavenger produces many compounds that remain in suspension, making possible their entry into the monocrystals, during the growth process, as metallic inclusions. This fact makes obtaining large size and pure type IIa crystals difficult. Also, achieving the elimination of nitrogen from the crystalline lattice of the diamond implies that during the process, other type of impurities may enter, such as is the case with boron. Diamond crystals with boron impurities are known as type IIb diamonds and are blue colored.

DESCRIPTION OF THE INVENTION

The present invention consists in obtaining a favorable vertical gradient of diamond growth with the capsule object of the invention, that prevails over any radial gradient by means of heating discs placed at the ends of the heating area, which implies having a considerable control over the growth conditions, more specifically, over the growth rate. This rigorous control over the growth rate makes possible a better control of the quality of large crystals. Another important novelty is using a source of carbon of a special design formed by cylindrical and conical hollows (graphite, amorphous carbon, diamond or other) with a solvent metal having a number of gases that are introduced in the capsule.

Also, a nitrogen scavenger is used to avoid the formation of nitrides, carbides, oxides that are harmful for the growth, that as important novelty is placed outside of the reaction area, that is, without coming into direct contact with the solvent used. In this manner, the solvent and the nitrogen scavenger not having come into direct contact, the inclusion problem and the problem of formation of reaction compounds between the nitrogen, the carbon and the scavenger are then avoided. These compounds are produced, and they are kept outside the diamond growth area, and therefore their inclusion inside the monocrystal is extremely difficult. This is possible because the nitrogen inside the reaction chamber has, usually, a great mobility by diffusion, entering into contact with the scavenger, that acts as a nitrogen trap, fixing it around the area where it is at and preventing that it re-enters the growth area.

Another important novelty of the present invention is the design of the frame-shaped seal joints.

Based on the above information, the list of advantages of the present invention in relation to the state of the prior art are the following:

For the Capsule:
1. Increased control over the temperature gradient attained by the use of the upper and lower heating elements that provide the following advantages:
    Change of the temperature gradient without modifying the composition or the dimensions of the growth are of the crystal or crystals.
    Change of the temperature gradient to obtain a greater growth rate and high quality crystal or crystals.
2. The casing is easier to prepare and manufacture because is made of a mixture of salts and refractory commercial oxides of well defined composition, instead of using pyrophyllite or other materials whose properties may differ.
3. The form and proportion of the carbon source allows growing larger crystals with less quantity of crystal solvent.

For the Scavenger or Getter:
1. Placing the getter or scavenger (from now on scavenger) outside of the growth area makes it possible to avoid the presence of particles or compounds that are not favorable for the diamond growth, such as carbides, nitrides, oxides or others.
2. Good and easy control of the diamond's color when the scavenger weight percent is between 0 and 10.0%.
3. The process of obtaining white crystals is not sensitive to an excess of scavenger if the scavenger weight percent exceeds approximately 15.0%. This property makes the process very reliable.

For the Seal Joints:
1. The frame-shape design of the seal joints facilitates the manufacture of its components.
2. Designing the seal joints shaped as frames makes their assembly inside the high pressure high temperature machine easier.
3. They do not contain any elements that are harmful to the environment or hazardous to health, such as powdery or carcinogenic substances.

PREFERRED EMBODIMENT OF THE INVENTION

Figure 1:
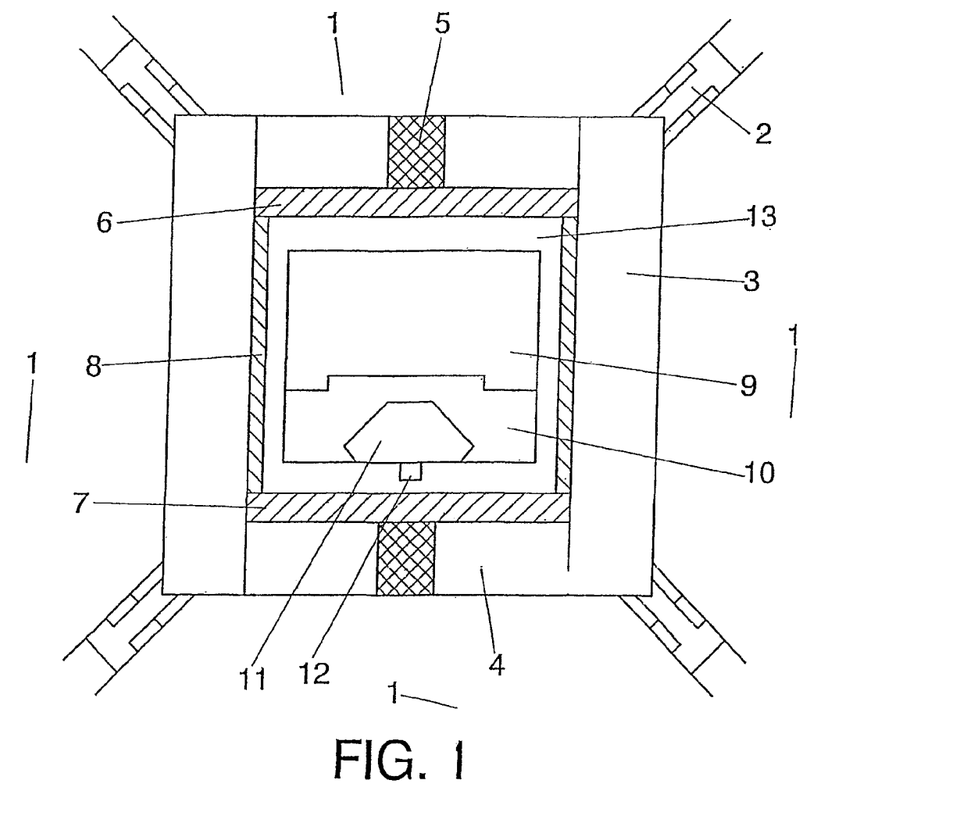
FIG. 1: Section of the high pressure high temperature capsule used in the synthesis of a confined monocrystal subject to high pressure.

The high pressure high temperature capsule object of the invention intended to attain the synthesis of a confined monocrystals subject to high pressure has the following elements as determined by:
1. A tungsten carbide (WC) punch
2. A high pressure seal joint
3. The capsule's casing
4. Upper and lower perforated tablet
5. Molybdenum element
6. Upper heating element
7. Lower heating element
8. Graphite tube
9. Carbon source
10. Solving metal
11. Synthesized crystal
12. Diamond seed
13. Insulation Heating discs 6 and 7 that permit obtaining a vertical gradient for the growth of diamonds are located on both ends of the heating area. Said gradient prevails over any radial gradient. The heating discs contain the following elements:
  a. An electrical insulating material ($ZrO_2$, $Al_2O_3$, other refractory oxides)
  b. An electrical conductor material (graphite, W, Mo and other refractory materials)
  c. An intermediate material that serves as a plasticizer (NaCl, CsCl, and other salts, MoO, other refractory materials)

Figure 4:
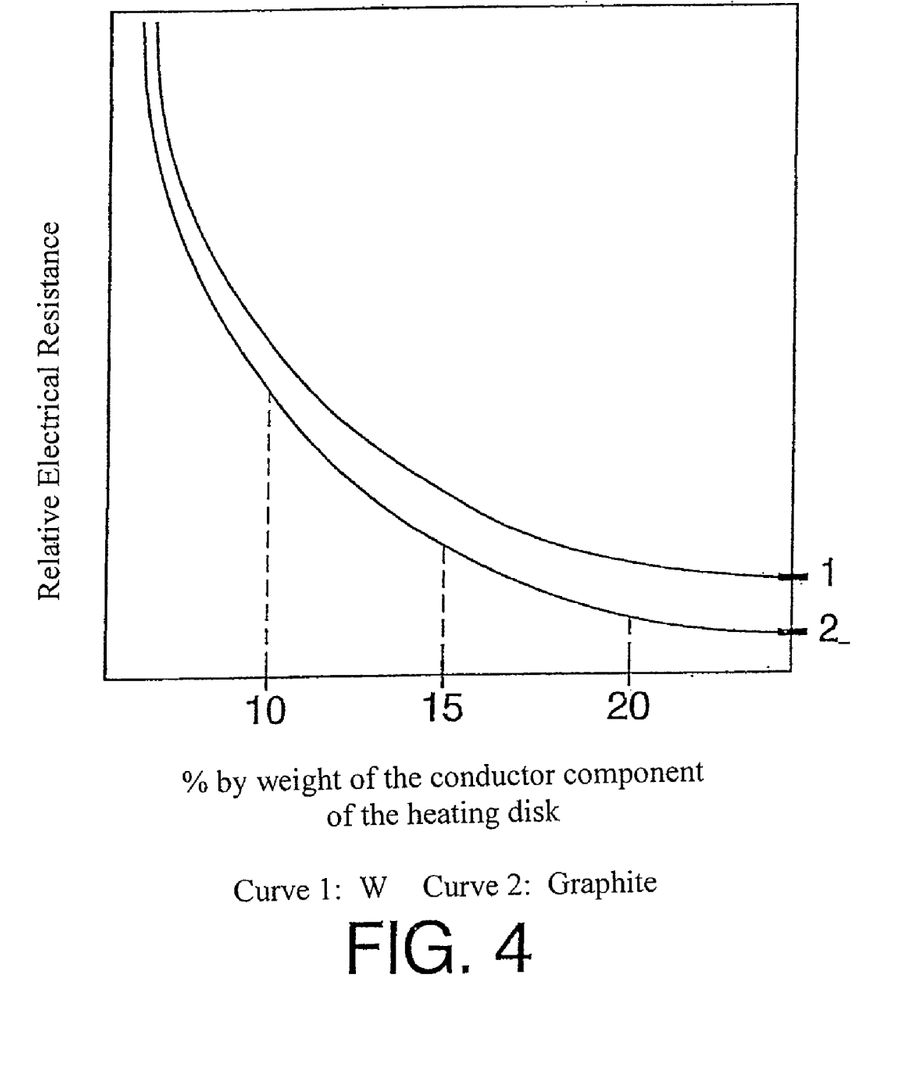
FIG. 4: Representation of the qualitative dependence of the electrical resistance of the heating disc as a function of the percentage by weight of the electrical conductivity element.
Figure 5:
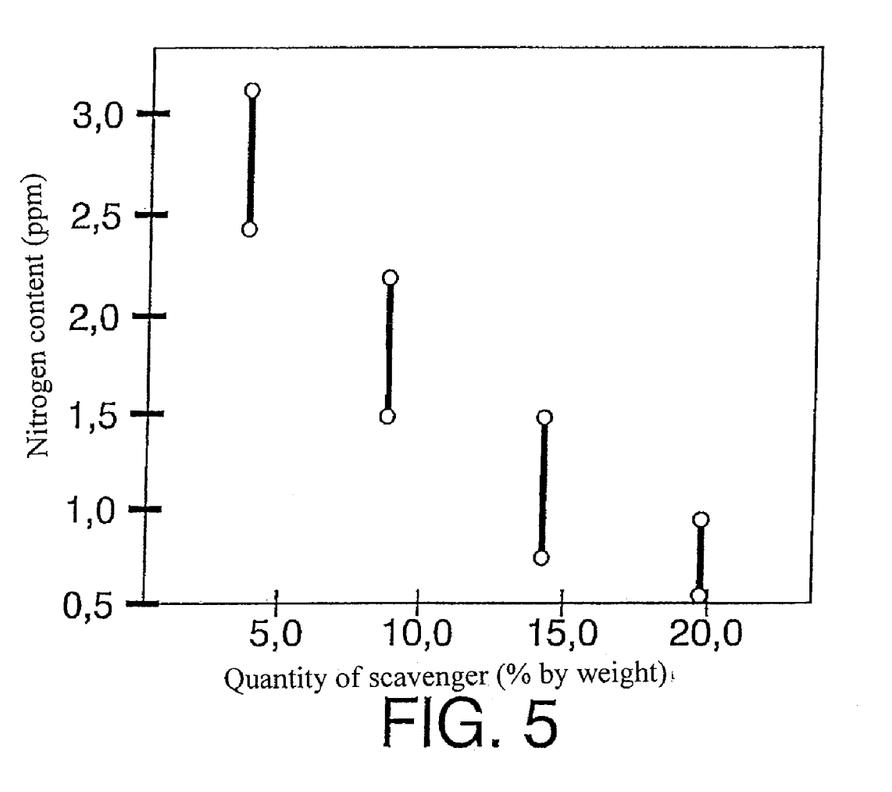
FIG. 5: Represents the amount of N in ppm that will remain inside the diamond as a function of the weight of the scavenger contained in the insulation material.

These three components are mixed in powder form in the following proportion by percent weight:
  a. 50-40
  b. 5-20 (as specified in FIG. 4)
  c. 50-40

The optimum gradient is obtained with the following variables:
  Composition of the heating disc
  Thickness
  Size, shape and position of the electrical contact points As a rule, the electrical resistance of the lower heating disc must be lower than that of the upper one.

Use of a carbon source 9 (graphite, amorphous carbon, diamond or other), with such a geometry that minimizes the amount of necessary metal solvent. Said source of carbon may use the various forms represented in FIGS. 3a, 3b and 3c, where it can be seen that the hollow may be cylindrical or conical. The solvent is introduced in the capsule in the form of a commercial solid alloy with minimum gas content.

The nitrogen scavenger (Al, Ti, Hf and others) is used outside of the diamond's growth area. The nitrogen is sequestered by the scavenger or getter outside the area of the diamond's growth, avoiding thus the formation of nitrides, carbides, oxides or any other undesirable phases for diamond growth.

The sequence is as follows:
  The nitrogen scavenger (Al, Ti, Hf and others) in powder form are mixed with the insulating material ($Al_2O_3$, $ZrO_2$, MgO and other refractory oxides)
  The proportion of the mix permits controlling the color of the diamond crystals
  A permeable membrane also permits regulating the color of the diamond crystal (nitrogen fixation)

Figure 2:
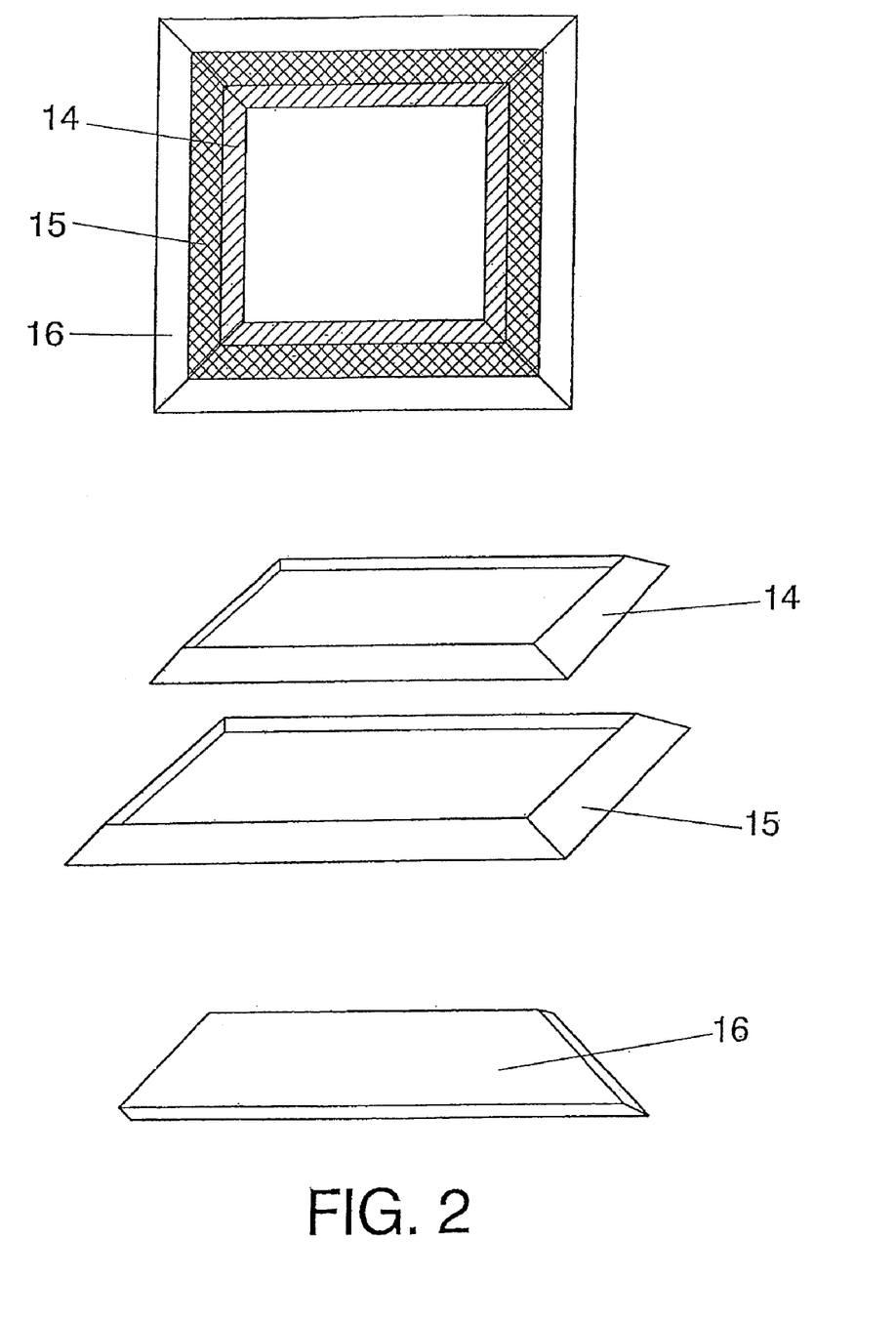
FIG. 2: high pressure seal joint.

The design of the high pressure seal joint is formed by the elements that make the assembly inside the high pressure high temperature machine easier, since it is composed by frames such as: steel frame 14, aluminum frame 15 and arachnid and mineral fibers 16 insulating material as specified in FIG. 2.

EXAMPLES

All the examples have been carried out according to the following general scheme:
  A set of WC punches, a set of high pressure seal joints and a reaction chamber duly adjusted are placed inside the high pressure high temperature chamber and the high pressure device is subjected to hydraulic pressure until reaching the value that has been previously calibrated. The temperature inside the chamber is increased by electrical power until an appropriate value is reached. Said power is maintained during a programmed time. Finally the temperature and the pressure are lowered, finishing the cycle. Then, the capsule is extracted, opened and the products are observed.

Examples 1 to 5

Figure 3:
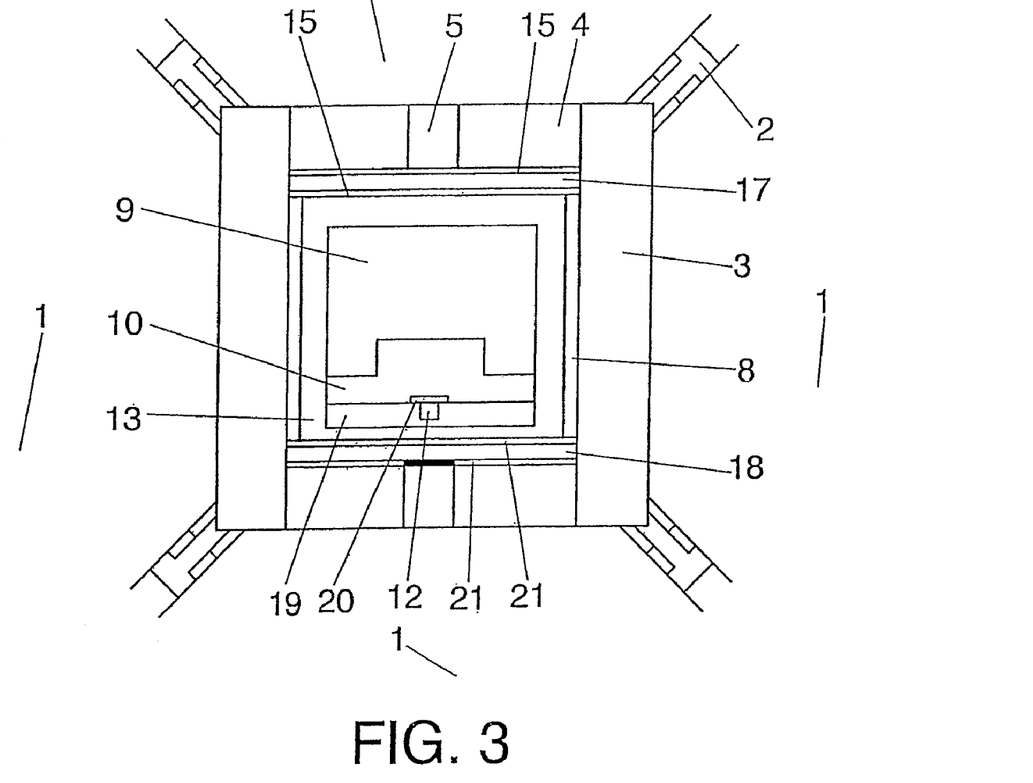
FIG. 3: Section of the high pressure high temperature capsule used in the synthesis of a type Ib monocrystal.
Figure 3A:
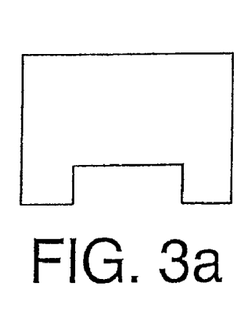
Figure 3B:
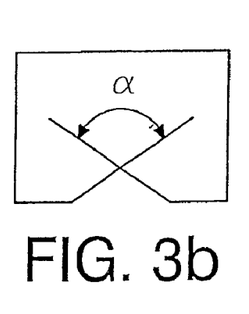
Figure 3C:
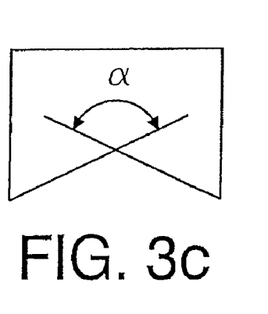

For the growth of type Ib yellow crystals the capsule shown in FIG. 3 is used. Said capsule has the following specific elements:
1. tungsten carbide punch
2. high pressure seal joint
3. capsule casing
4. lower perforated cover
5. molybdenum electrode
8. graphite tube
9. carbon source
10. metal solvent
12. diamond seed
13. insulation
17. upper heating disc
18. lower heating disc
19. matrix disc
20. platinum plate
21. molybdenum disc The temperature gradient is adjusted between 10 and 50° C., graphite is used as the source of carbon. The results obtained are shown in Table 1.

All the crystals are characterized by their yellow color and their octahedral or cubeoctahedral shape. The nitrogen concentration is between 50 and 150 ppm. The metallic inclusions are concentrated in the initial seed area.

TABLE 1

|  | Example 1 | Example 2 | Example 3 | Example 4 | Example 5 |
| --- | --- | --- | --- | --- | --- |
| Synthesis pressure (G Pa) | 5.0 | 5.0 | 5.0 | 5.0 | 5.0 |

TABLE 1-continued

|  | Example 1 | Example 2 | Example 3 | Example 4 | Example 5 |
|---|---|---|---|---|---|
| Temperature °C. | 1360 | 1360 | 1360 | 1350 | 1380 |
| Solvent's composition (% by weight) | Fe—65 Ni | Fe—65 Ni | Fe—65 Co | Fe—65 Ni | Fe—65 Ni |
| Time (h) | 90 | 105 | 100 | 140 | 90 |
| Growth rate (mg/h) | 8.5 | 12.2 | 10.1 | 7.9 | 13.9 |
| Weight of the crystal (carats) | 3.82 | 6.4 | 5.05 | 5.53 | 6.25 |
| Metallic inclusions | Lower part | Lower part | Lower part | There are no inclusions | Lower part |

Example 6

Powdered synthetic diamond is used as the carbon source. The conditions are the same as those described for Example 1. After 85 hours of maintaining them, a 3.6 carat crystal with a nitrogen concentration of 120 ppm is obtained.

Examples 7 to 11

Figure 6:
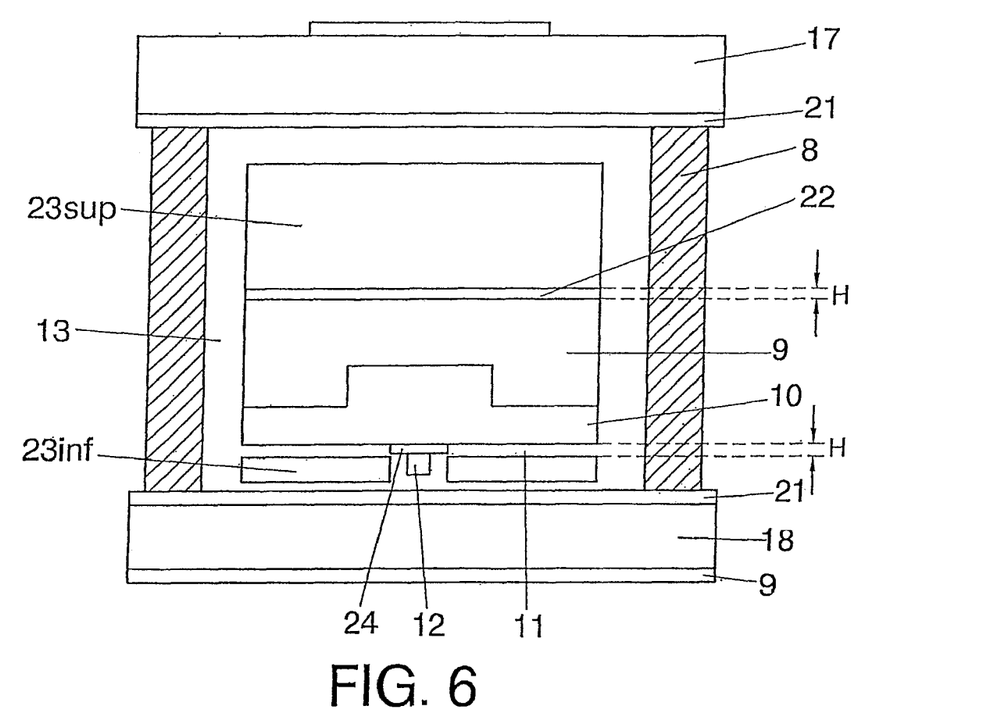
FIG. 6: Section of the internal part of the capsule used in the synthesis of type IIa and IIb crystals.
Figure 7:
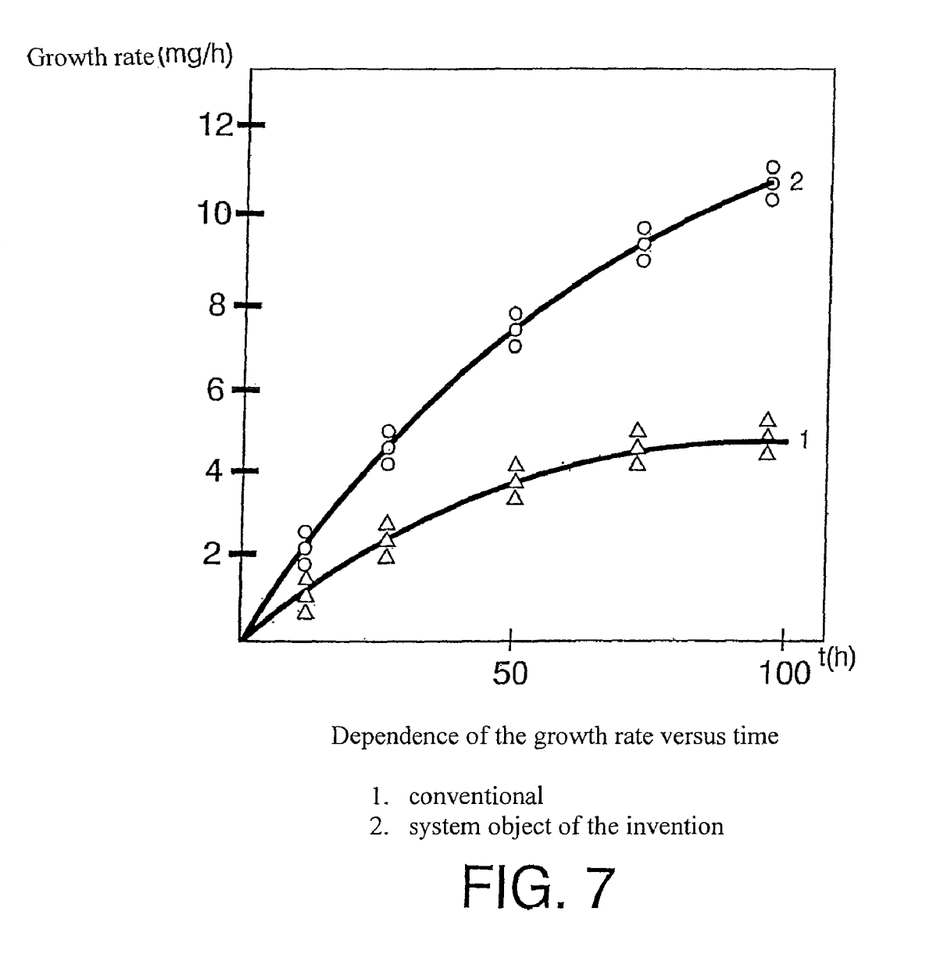
FIG. 7: Represents how incorporating the heating discs of the invention has improved, for similar quality, the growth rate in relation to time when compared to conventional systems.

To grow slightly colored crystals the capsule shown in FIG. 6 is used. The capsule has the following elements:
8. Graphite tube
9. Carbon source
10. Solvent metal
12. Diamond seed
13. Insulation
17. Upper heating disc
18. Lower heating disc
21. Molybdenum disc
22. Permeable membrane of H height
23. Lower surface
24. Platinum plate The temperature gradient is adjusted between 10 and 40° C., crystalline graphite is used as the source of carbon. The color of the diamond crystals is regulated by the thickness, H, of membrane 22 and the amount of scavenger present in the mixture 23.

Crystals of up to 5.5 carats in weight and different colorations have been obtained. There are metal inclusions in all the crystals in the area of the seed. Said inclusions do not prevent their commercial application. The capsule is that shown in FIG. 6.

The results obtained are shown in Table 2.

TABLE 2

|  | Example 7 | Example 8 | Example 9 | Example 10 | Example 11 |
|---|---|---|---|---|---|
| Solvent's composition (% by weight) | Fe—60 Co | Fe—60 Co | Fe—65 Ni | Fe—60 Co | Fe—60 Co |
| Time (h) | 90 | 95 | 84 | 100 | 105 |
| Weight of the crystal (carats) | 4.45 | 5.46 | 3.65 | 4.05 | 3.94 |
| *Scavenger (% by weight) | 2.0% Ti | 5.0% Ti | 10.0% Al | 10.0% Ti | 12.0% Al |
| Thickness of membrane H (mm) | 0.25 | 0.5 | 0.5 | 0.3 | 0.3 |
| **Color (GIA scale) | L | K | J | J | J |

*Relationship between % weight of the scavenger (Ws) and the solvent (Wd)
**GIA Gemological Institute of America Examples 12 and 14

To grow white crystals the capsule shown in FIG. 6 is used.
The temperature gradient is adjusted between 10 and 30° C. and crystalline graphite is used as the source of carbon.

The color of the diamond crystals is regulated by the thickness H of membrane 22 and the amount of scavenger present in the mixture 23. Ti and Al have been the scavenger used. The growth rate has been adjusted between 2 and 8 mg/h. White crystals of up to 1.8 carats valid for decorative purposes have been obtained. There are metallic inclusions in all the crystals in the seed area. The results obtained are shown in Table 3.

TABLE 3

|  | Example 12 | Example 13 | Example 14 |
|---|---|---|---|
| *Scavenger (% by weight) | 15.0% Al | 15.0% Al | 17.0% Al |
| **Color (GIA scale) | I | H | H |

*Relationship between % weight of the scavenger (Ws) and the solvent (Wd)
**GIA Gemological Institute of America Examples 15 and 16

To grow blue crystals the capsule shown in FIG. 6 is used. The pressure, temperature and gradient parameters used are the same as those of examples 12 and 14. Between 1 and 60 ppm of B are introduced in the solvent metal. Crystals of different blue hues are obtained. The results are shown in Table 4.

TABLE 4

|  | Example 15 | Example 16 |
| --- | --- | --- |
| Solvent's composition (% by weight) | Fe—65 Co | Fe—65 Ni |
| *Scavenger (% by weight) | 15.0% Ti | 15.0% Ti |
| Time (h) | 96 | 85 |
| Weight of the crystal (carats) | 1.2 | 0.87 |
| Boron (ppm) | 20 | 60 |
| Color | Blue | Opaque Blue |

*Relationship between % weight of the scavenger (Ws) and the solvent (Wd)
**GIA Gemological Institute of America

The invention claimed is:

1. A reaction capsule for the synthesis of diamonds by the temperature gradient method, characterized in that it comprises an upper heating disc and a lower heating disk of lesser electrical resistance, with the following percentage composition by weight;

a refractory oxide functioning as insulator 50 to 40%
a refractory metal functioning as conductor 5 to 20%
a plasticizer 50 to 40% the refractory oxide functioning as insulator being selected from the group consisting of $ZrO_2O_3$ and $Al_2O_3$, the refractory metal functioning as a conductor being selected from the group consisting of graphite, W and Mo, and the plasticizer being selected from the group consisting of NaCl, CsCl and MoO.

2. The reaction capsule in accordance with claim 1, characterized in that it comprises a nitrogen scavenger selected from the group consisting of Al, Ti and Hf, provided outside the growth zone of the diamond, and mixed with a refractory oxide selected from the group consisting of $Al_2O_3$, $ZrO_2$ and MgO, being provided also a permeable membrane that permits regulating the color of the diamonds.

* * * * *

UNITED STATES PATENT AND TRADEMARK OFFICE
CERTIFICATE OF CORRECTION

PATENT NO. : 8,057,597 B2
APPLICATION NO. : 11/816075
DATED : November 15, 2011
INVENTOR(S) : Ramon Martin Parrondo et al.

It is certified that error appears in the above-identified patent and that said Letters Patent is hereby corrected as shown below:

Col. 7, claim 9, line 15 should read as follows:

9. A reaction capsule for the synthesis of diamonds by the temperature gradient method, characterized in that it comprises an upper heating disc and a lower heating disk of lesser electrical resistance, with the following percentage composition by weight;

a refractory oxide functioning as insulator 50 to 40% a refractory metal functioning as conductor 5 to 20% a plasticizer 50 to 40% the refractory oxide functioning as insulator being selected from the group consisting of ~~$ZrO_2O_3$~~ $\underline{ZrO_2}$ and $Al_2O_3$, the refractory metal functioning as a conductor being selected from the group consisting of graphite, W and Mo, and the plasticizer being selected from the group consisting of NaCl, CsCl and MoO.

Signed and Sealed this
Twentieth Day of December, 2011

David J. Kappos
*Director of the United States Patent and Trademark Office*

UNITED STATES PATENT AND TRADEMARK OFFICE
CERTIFICATE OF CORRECTION

PATENT NO. : 8,057,597 B2
APPLICATION NO. : 11/816075
DATED : November 15, 2011
INVENTOR(S) : Ramon Martin Parrondo et al.

It is certified that error appears in the above-identified patent and that said Letters Patent is hereby corrected as shown below:

Col. 7, line 15 - Col. 8, line 16, Claim 1, should read as follows:

1. A reaction capsule for the synthesis of diamonds by the temperature gradient method, characterized in that it comprises an upper heating disc and a lower heating disk of lesser electrical resistance, with the following percentage composition by weight;

a refractory oxide functioning as insulator 50 to 40% a refractory metal functioning as conductor 5 to 20% a plasticizer 50 to 40% the refractory oxide functioning as insulator being selected from the group consisting of ~~$ZrO_2O_3$~~ $ZrO_2$ and $Al_2O_3$, the refractory metal functioning as a conductor being selected from the group consisting of graphite, W and Mo, and the plasticizer being selected from the group consisting of NaCl, CsCl and MoO.

This certificate supersedes the Certificate of Correction issued December 20, 2011.

Signed and Sealed this
Twenty-fourth Day of January, 2012

David J. Kappos
*Director of the United States Patent and Trademark Office*